United States Patent Office 3,530,051
Patented Sept. 22, 1970

3,530,051
ELECTROLYTIC METHOD FOR PREVENTING FOULING OF SEA WATER-IMMERSED STRUCTURES BY MARINE LIFE
Kenji Ueda, Nagasaki-shi, Minoru Hirata, Nishisonoki-gun, Nagasaki-ken, and Tsutomu Horiguchi, Nagasaki-shi, Japan, assignors to Mitsubishi Jukogyo Kabushiki Kaisha, Tokyo, Japan
Filed July 1, 1966, Ser. No. 562,316
Claims priority, application Japan, July 5, 1965, 40/40,269
Int. Cl. C23f *13/00*
U.S. Cl. 204—147      2 Claims

ABSTRACT OF THE DISCLOSURE

In a method for preventing adherence to marine life to structures submerged in sea water by immersing, in the sea water adjacent the structure, an insoluble anode and at least one cathode in closely spaced relation and passing a current between the anode and the cathode or cathodes, the build up of deposits on the cathode or cathodes, is prevented by maintaining the current value so as to have a current density, on each cathode, in excess of 3 a./dm.$^2$.

---

This invention relates to the prevention of fouling of sea water-immersed structures by marine life and, more particularly, to a novel electrolytic method for preventing such fouling.

In order to prevent difficulties arising from the choking of flow passages, for example, of sea ducts and sea water coolers of steam power plants, marine vessels, etc., by adherence of marine life thereto, and to preclude various undesirable consequences of adherence of marine life to the submerged parts of hulls, it is usual, in practice, to coat the surfaces in contact with sea water with copper-containing paints and to introduce chlorine in the sea water flow passages.

It is also known that non-consumable electrodes, or platinum, platinum alloys, magnetic iron oxides, etc. when used as anodes, in the electrolysis of sea water, will evolve chlorine and hypochlorite which inhibits growth of marine life.

It is further known that, during electrolysis of sea water, hydrogen generally will be evolved on the cathode and result in an increase in the amount of hydroxyl ions (OH)$^-$ around the cathode with consequent deposition, on the cathode, of calcium carbonate and magnesium hydroxide which are hard components of sea water. Since the specific conductance of sea water is usually as low as 4000$\mu\eth$, the power loss due to the resistance of the sea water is undesirably large. For this reason, it is advisable, in effecting electrolysis of sea water for the purpose of preventing marine life adhering to submerged surfaces, to employ the least possible gap or interspace between the electrodes, thereby to minimize the power loss. However, a reduced gap between the electrodes can permit the cathode deposits to clog the gap and obstruct the flow of sea water.

For the foregoing reasons, it is important, when using electrolysis of sea water to prevent deposition of marine life on submerged structures, to provide a method for precluding the possibility of inter-electrode choking by the cathode deposits and also to provide electrodes particularly suitable for preventing such choking. Additionally, the electrode arrangement should be such that the relatively expensive anode may be protected against mechanical damage due to flotsam and jetsam and other debris in sea water.

As a result of experiments, it has been found that the deposition of hard constituents of sea water on a cathode increases proportionately with the cathode current density until the current density reaches 0.1 a./dm.$^2$. For example, the deposits attained a thickness of 0.5 mm. using a current density of 0.05 a./dm.$^2$ for 100 hours but, with a current density of 1 a./dm.$^2$ the thickness of the deposits is very substantially decreased and, at a current density in excess of 3 a./dm.$^2$, there is almost no deposition of the cathode. Thus, above a current density of 1 a./dm.$^2$, the thickness of the cathode deposit decreases with increase of the current density at the cathode.

The thickness of the deposition on the cathode is 0.2 mm. for 45 hours with a current density of 0.05 a./dm.$^2$ and under normal temperature. The thickness of the cathode deposits under current densities of 0.05, 0.1, 1, 2, 4 and 18.6 a./dm.$^2$ are shown in the following table:

TABLE A

| Cathode current density, A./dm.$^2$ | Duration of current flow, hours | | Measured thickness at 200 hours, mm. |
|---|---|---|---|
| | 200 | 400 | |
| | Calculated thickness of deposition, mm. | | |
| 0.05 | 1 | 2 | 1 |
| 0.1 | 2 | 4 | |
| 1 | 20 | 40 | 3 |
| 2 | 40 | 80 | |
| 4 | 80 | 160 | <0.2 |
| 18.6 | 370 | 740 | <0.2 |

The above relation between cathode current density and measured thickness of the cathode deposits is illustrated graphically in FIG. 8, from which it will be seen that the thickness of the deposit is extremely decreased with a current density of not less than 3 a./dm.$^2$.

The probable reason for the observed phenomenon is that, at a cathode current density of not less than 3 a./dm.$^2$, the pH value of sea water around the cathode will be increased until the deposit is re-dissolved, and that hydrogen bubbles thus vigorously evolved may strip the deposits from the cathode.

Consequently, for preventing sticking of marine life to structures submerged in sea water, it is necessary to choose, for the electrodes, either an extremely small cathode current density or a density of at least 3 a./dm.$^2$ so as to prevent the disadvantageous results of clogging of the inter-electrode spaces or gaps. On the other hand, the size of the anode must be selected on the basis of the current required for effectively generating chemical components for preventing growth of marine life, according to the amount of sea water in contact with the structures and also on the basis of the critical current density applicable to the anode.

Parallel plate electrodes, as commonly used, are ineffective to meet such requirements due to the fact that the narrow and consequently essentially long, inter-electrode space is easily clogged or blocked.

Therefore, an object of the present invention is to provide a method of preventing sticking of marine life to submerged objects by electrolysis in which, notwithstanding a limited inter-electrode spacing, the inter-electrode space is not clogged by cathode deposits produced by electrolysis of sea water.

A further object of the invention is to provide a method for preventing adherence of marine life to structures submerged in sea water by effecting, between an insoluble anode and a cathode structure surrounding the anode and spaced therefrom, a flow of electrolytic current having a density on the cathode structure in excess of 3 a./dm.$^2$.

In accordance with the invention, an anode, which may be a columnar anode comprising silver plated with platinum or platinum alloy, titanium plated with platinum, or magnetic iron oxide, is positioned at the center of an electrode arrangement. This anode is surrounded by a cathode construction and the cathode construction may comprise a plurality of round rods, or net-like spiral or cylindrical metallic members provided with plural perforations, and suitable dielectric material is interposed between the anode and the cathode construction. The arrangement is such as to provide an integral unit wherein the current density on the cathodes is maintained at a value of not less than 3 a./dm.$^2$, the current flow between the anode and the cathode for the electrolysis of sea water. The cathodes surrounding the anode also serve to protect the latter against impact with flotsam and other debris in the sea water.

For an understanding of the principles of the invention, reference is made to the following description of typical embodiments of the invention as illustrated in the accompanying drawings.

Figure 1:
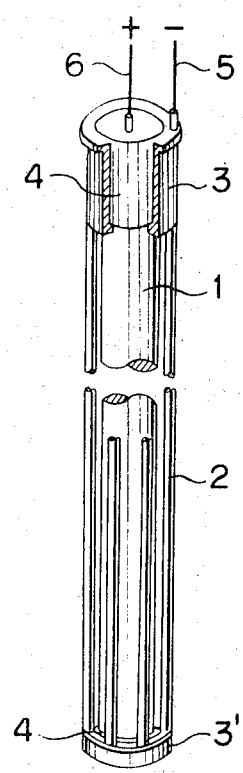
FIG. 1 is a perspective elevation view, partly in section, of one form of electrode unit for practicing the method of the invention.
Figure 8:
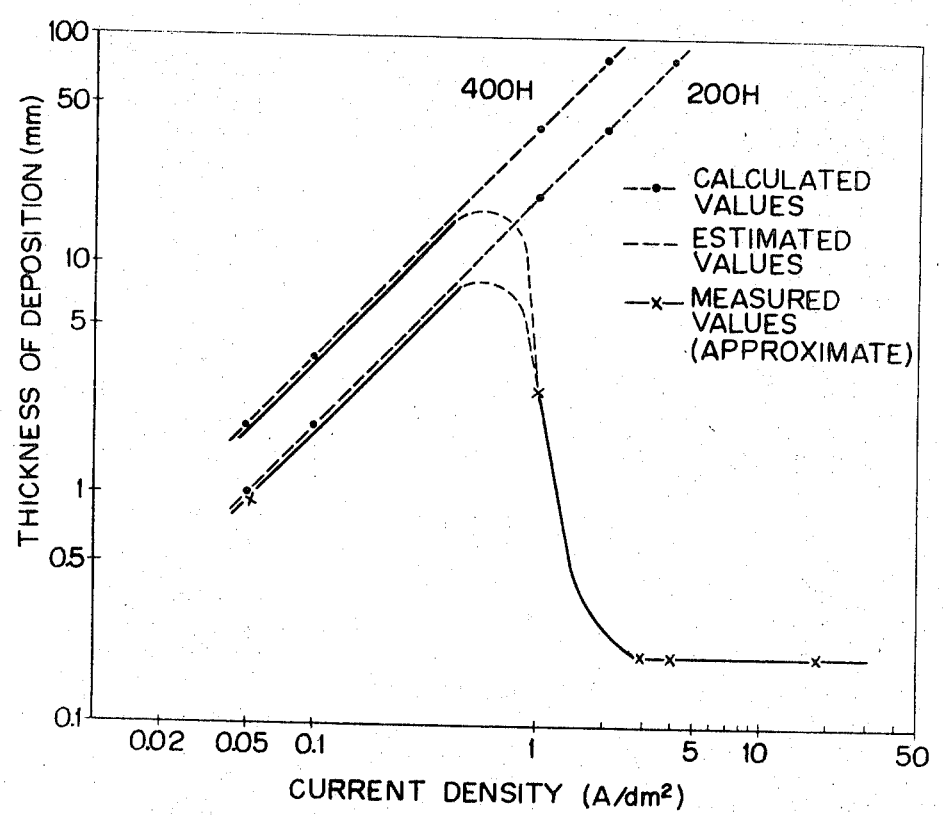

FIG. 8 is a graphic illustration showing the relation between cathode current density and the thickness of deposition on the cathodes, corresponding to table A mentioned hereinbefore; and Referring to FIG. 1, the electrode unit illustrated therein, comprises a plurality of round bar cathodes 2 surrounding an anode 1. The anode is formed, for example, of a round rod of commercially available magnetic iron oxide, 56 mm. in diameter and 740 mm. in length. Anode 1 is positioned in the center of the unit and is surrounded by the cathodes 2 which, in the illustrated embodiment, are six mild steel round rods secured at uniform intervals to mild steel end support frames 3 and 3'. To facilitate mounting of the unit, end frame 3 is flanged.

A suitable dielectric material 4 is used for insulation between anode 1 and cathodes 2. In the illustrated embodiment, this dielectric or insulating material is a rigid polyvinyl chloride pipe or tube used in the form of sleeves on the upper and lower portions of the anode. These sleeves are sealed with synthetic resin at the top and bottom of the ends of the anode, whereby the round rod cathodes 2 are spaced equal distances from anode 1. A cathode lead wire 5 is suitably secured to a terminal on support frame 3, and an anode lead wire 6 is secured to the assembly in such a way that the anode assembly 1–4 can be readily pulled out of the electrode unit by simply pulling lead wire 6 upwardly.

Figure 2:
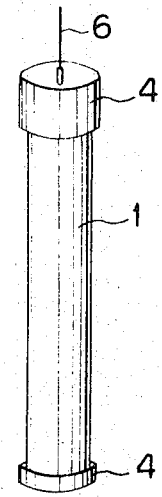
FIG. 2 is a perspective elevation view of the anode forming part of the unit shown in FIG. 1.

FIG. 2 illustrates the anode forming part of the unit shown in FIG. 1. The anode is designed for an anode current of 60 a. (5 a./dm.$^2$) and because the surface area of each round rod cathode is about 230 cm.$^2$, the average current density on the cathodes is 4.3 a./dm.$^2$ or high enough to prevent the possibility of deposits forming on the cathodes.

Generally, an electrolytic current concentration of 0.3 a./(m.$^3$/h.) of sea water can prevent adherence of marine life. Assuming that the intake of a sea water inlet pipe, to be protected against adherence of marine life thereto is 200 m.$^3$/h. (which corresponds to the amount of water for cooling a condenser of a power plant having a capacity of about 15,000 kw.), the electrolytic current required can be calculated to be $$0.3 \text{ a.}/(\text{m.}^3/\text{h.}) \times 2000 \text{ m.}^3\text{h.} = 600 \text{ a.}$$

To meet this requirement, it is necessary to employ only about 10 electrode units of the type shown in FIG. 1.

Figure 3:
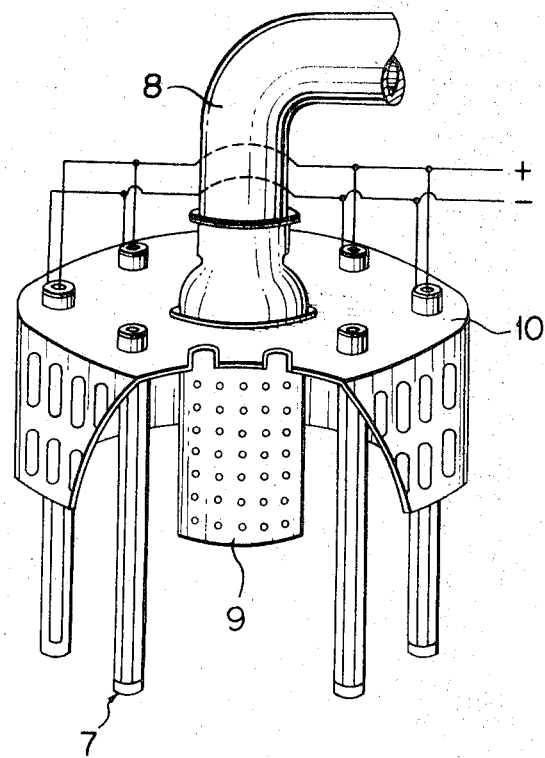
FIG. 3 is a perspective elevation view, partly broken away, of one form of arrangement comprising plural electrode units shown in FIG. 1, as fitted to a sea inlet port.

FIG. 3 illustrates these electrode units as mounted at a sea water inlet port. Referring to FIG. 3, the individual electrode units shown in FIG. 1 are designated at 7. A sea water pipe is indicated at 8, a strainer for removing flotsam and debris from the sea water is indicated at 9, and a support for the electrode units is indicated at 10. This support 10 is, in turn, fixed to a mounting flange of the strainer. Support 10 has a cylindrical shape with a suitably perforated circumferential wall and a top end wall, so that it can prevent evaporation of the products of the electrolysis and prevent dispersion of the effective constituents due to the force of waves and the like.

Since each individual anode is surrounded by cathodes, as described, the current distribution is substantially uniform and generation of stray currents is minimized, whereby other apparatus is prevented from corrosive attack. A further advantage of the arrangement is that safety to personnel is assured because the cathodes are grounded for protection from electrical shock. For reasons of structural strength, cylindrical support 10 is made of ordinary mild steel and is preferably connected to the negative side of the electrode unit so that this support can be protected from corrosion.

Figure 4:
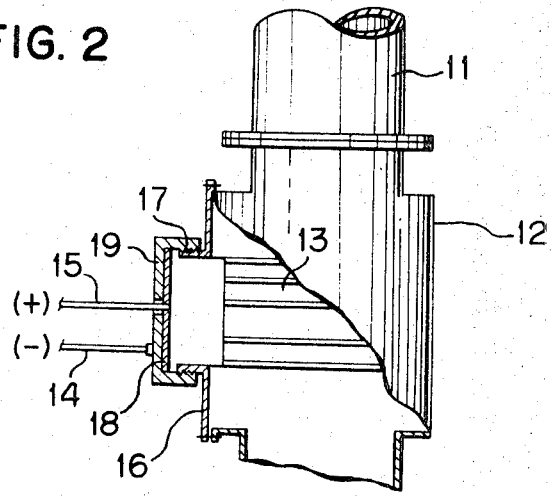
FIG. 4 is an elevation view, partly in section, of another form of arrangement comprising the electrode unit shown in FIG. 1, as fitted in an electrolytic tank communicating with sea water piping.

FIG. 4 illustrates the electrode unit as mounted in an electrolytic tank connected to sea water piping. Referring to FIG. 4, a sea water pipe is indicated at 11 as extending into an electrolytic tank 12 for accommodating the electrode unit. The tank may be of any desired configuration, although its capacity is dependent on the side of sea water pipe 11. The electrode units are illustrated at 13, each comprising a central anode surrounded by a plurality of cathodes as described in connection with FIG. 1. Lead wires 14 and 15 are connected to the anode and to the cathodes, respectively.

A support plate for the electrode unit is indicated generally at 16 as forming part of the enclosure of the electrolytic tank and as including a threaded extension 17 serving as an electrode assembly receiver. The extension 17 is formed with apertures for inserting the electrode units into the electrolytic tank, and is threadedly engaged with a closure 19 with the interposition of a gasket 18. The cathode lead wire may extend from closure 19, support plate 16, or electrolytic tank 12.

Figure 5:
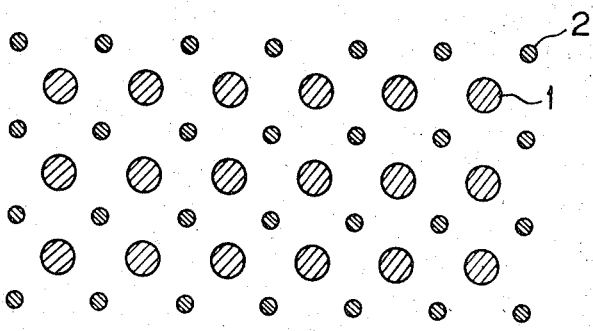
FIGS. 5, 6 and 7 are somewhat diagrammatic horizontal sectional views of other anode and cathode arrangements for practicing the method of the invention.
Figure 6:
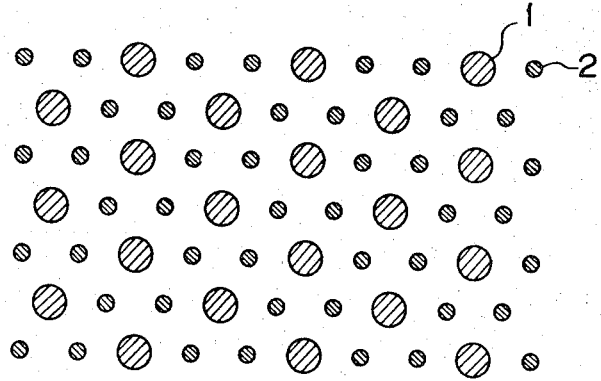
Figure 7:
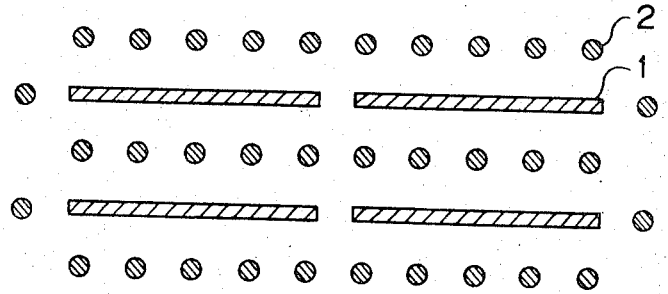

It is also possible to mount the cathodes of electrode units 13 to support plate 16 in any desirable manner whereby they surround the respective individual anode. Thus, the arrangement of anodes and cathodes in the electrode units may take the modified forms such as shown in FIGS. 5–7 wherein it will be noted that, in each case, an anode 1 is surrounded by cathodes 2. FIG. 8 graphically illustrates the relation between the current density and thickness of cathodic deposits. It will be clear, from FIG. 8, that the deposition is greatly decreased when the cathode current density is equal to at least 3 a./dm.$^2$.

Summarizing the invention as described above, the method for preventing adherence of marine life whereby electrode devices for performing the invention and whereby clogging of sea water intake pipes and other difficulties, such as increased resistance of hull bottoms due to deposition of marine life, through electrolysis of sea water, involves the positioning of cathodes around respective individual anodes, with the inter-electrode spaces being very small as compared with those electrode plates arranged in parallel, whereby the power loss due to liquid resistance is minimized. Nevertheless, the short inter-electrode spacings can be prevented from clogging by hard constituents of sea water, thus positively preventing adherence of marine life through the electrolysis of sea water. The method of the invention is very valuable industrially, particularly because the relatively expensive anodes are surrounded by cathodes and are thus protected from mechanical damage due to flotsam.

What is claimed is:

1. In the technique of preventing adherence of marine life to structures submerged in sea water by immersing, in the sea water adjacent the structure, an insoluble anode and at least one cathode in closely spaced relation and passing a current between the anode and the cathode to electrolyze the sea water to produce substances inhibiting growth of the marine life with deposition, of hard components of the sea water, on the cathode tending to block the relatively narrow anode-cathode flow passages: the method of preventing build-up of such cathode deposits comprising maintaining, on the cathode, a current having a density in excess of 3 a./dm.$^2$.

2. The method claimed in claim 1 in which plural cathodes are immersed in the sea water surrounding and uniformly spaced from a central anode and the current density on each cathode being maintained in excess of 3 a./dm.$^2$.

References Cited

UNITED STATES PATENTS

| | | | |
|---|---|---|---|
| 3,117,023 | 1/1964 | Tirrell | 204—128 |
| 3,329,595 | 7/1967 | Barbato et al. | 204—128 |
| 3,364,127 | 1/1968 | Inoue et al. | 204—98 |
| 695,573 | 3/1902 | Magnier et al. | 204—272 |
| 3,303,118 | 2/1967 | Anderson | 204—196 |
| 3,385,779 | 5/1968 | Nishiba et al. | 204—272 |

FOREIGN PATENTS

| | | |
|---|---|---|
| 150,318 | 6/1921 | Great Britain. |
| 823,531 | 11/1959 | Great Britain. |
| 901,204 | 7/1962 | Great Britain. |
| 623,382 | 10/1962 | Belgium. |

T. TUNG, Primary Examiner

U.S. Cl. X.R.

204—149, 196, 272